US007042519B2

(12) United States Patent
Lim

(10) Patent No.: US 7,042,519 B2
(45) Date of Patent: May 9, 2006

(54) CONTROL APPARATUS AND METHOD FOR PREVENTING REPEATED SIGNAL PROCESSING IN SIGNAL PROCESSING SYSTEM

(75) Inventor: Dae-sung Lim, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 776 days.

(21) Appl. No.: 10/141,944

(22) Filed: May 10, 2002

(65) Prior Publication Data

US 2003/0090594 A1  May 15, 2003

(30) Foreign Application Priority Data

Nov. 12, 2001  (KR) ............................... 2001-70122

(51) Int. Cl.
*H04N 5/21* (2006.01)
(52) U.S. Cl. ....................................... 348/627; 348/625
(58) Field of Classification Search ................ 348/607, 348/608, 625, 627, 552, 725, 723, 724, 731; H04N 5/21, H04N 5/44, 5/38

See application file for complete search history.

(56) References Cited

U.S. PATENT DOCUMENTS

| 5,442,403 A | * | 8/1995 | Yasumoto et al. | ........ | 348/432.1 |
| 6,476,873 B1 | * | 11/2002 | Maeng | ...................... | 348/561 |
| 6,823,088 B1 | * | 11/2004 | Kaneko et al. | ............. | 382/266 |
| 6,919,930 B1 | * | 7/2005 | Barreyro et al. | ............ | 348/723 |

* cited by examiner

*Primary Examiner*—Sherrie Hsia
(74) *Attorney, Agent, or Firm*—Sughrue Mion, PLLC

(57) ABSTRACT

A control apparatus and method for processing a signal, and more particularly, a control apparatus and method for preventing a signal from being processed repeatedly by transmitting and receiving information related to a signal processing in a composite signal processing system that contains a television and a peripheral device. A signal providing device transmits enhancer information related to the signal processing by means of a wired or wireless communication. A signal receiving device uses the enhancer information and controls a signal processing block. Therefore, since the signal receiving device prevents the enhancer signal from being processed repeatedly, distortion of the signal can be avoided and an optimum signal can be output.

11 Claims, 5 Drawing Sheets

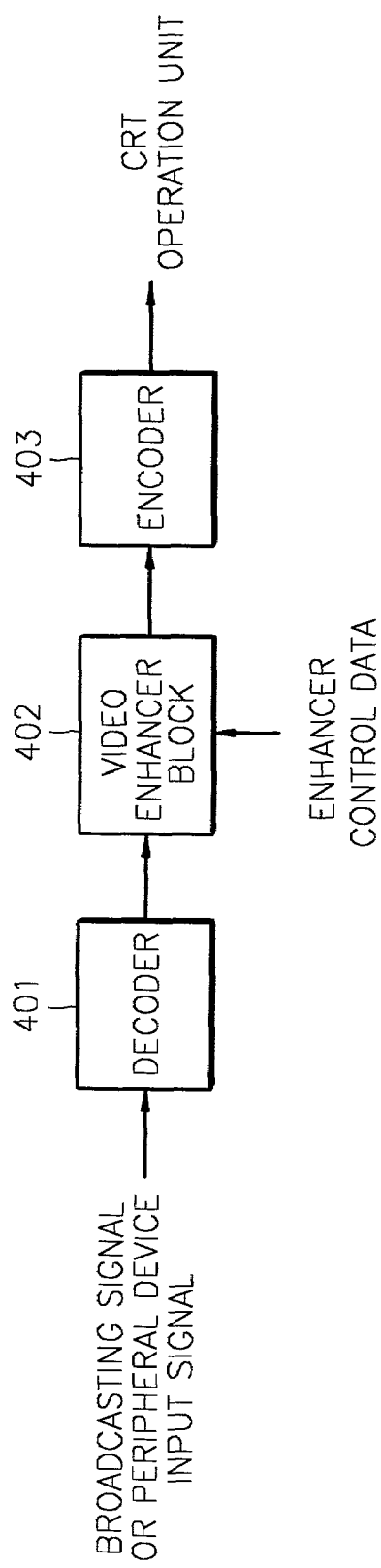
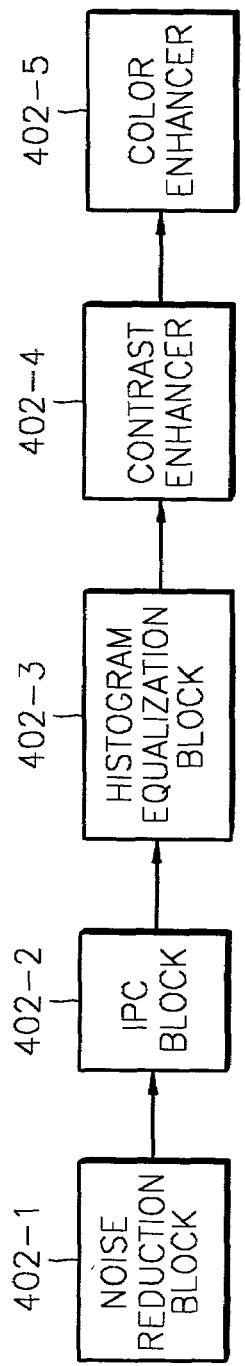

CONTROL APPARATUS AND METHOD FOR PREVENTING REPEATED SIGNAL PROCESSING IN SIGNAL PROCESSING SYSTEM

BACKGROUND OF THE INVENTION

1. Field of the Invention

The present invention relates to a control apparatus and a method for processing a signal, and more particularly, to a control apparatus and a method for preventing a signal from being processed repeatedly by transmitting and receiving information related to a signal processing in a multiple signal processing system that contains a television and a peripheral device. The present application is based on Korean Application No. 2001-70122, filed Nov. 12, 2001, which is incorporated herein by reference.

2. Description of the Related Art

As development of signal processing technology proceeds, there is a tendency to include in television sets various enhancer blocks such as an Interlace to Progressive Conversion (IPC) block, a frame rate conversion block, a detail enhancer block, a contrast enhancer block, a color enhancer block, a noise reduction block and a histogram equalization block in order to improve reproducibility of a signal in a basic signal processing block.

As signal processing blocks, the above various enhancer blocks can be adopted in not only the television receiver but also peripheral devices, which provide the signal, such as a VCR, a set-top box, a DVD player and an audio device.

FIG. 1 shows an existing composite signal processing system. A television 100 processes a signal input from a peripheral device 120 or a broadcasting signal received from a broadcasting station 110. However, the television 100, which receives the signal, cannot know which enhancer signal processing is performed by the peripheral device 120 which provides the signal, or how much weight the enhancer processing has.

In case the television has a built-in enhancer block 100-1, the same enhancer block signal processing is performed by not only a peripheral device 120-1 but also the television. Therefore, the quality of video and audio is deteriorated. That is, for example, if detail enhancement is executed repeatedly, the boundary of image signals displayed is over-emphasized and the quality of the video is deteriorated. If contrast enhancement is executed repeatedly, the difference between light and shade is too great. If noise reduction enhancement is executed repeatedly, a large portion of the high frequency region of an original signal is attenuated and the displayed image is too dim.

SUMMARY OF THE INVENTION

To solve the above-described problems, it is an object of the present invention to provide a control apparatus and a method for preventing a repeated signal processing in a composite signal processing system containing a signal providing device, which generates information related to a signal processing, and a signal receiving device, which uses the transmitted information related to the signal processing and prevents repeated signal processing.

Accordingly, to achieve the above object, there is provided a signal processing device for transmitting enhancer information, the signal processing device comprising: an enhancer means for improving a video signal and an audio signal by means of a predetermined signal processing process; a controller for extracting enhancer information executed by the enhancer means and generating an enhancer control signal corresponding to the extracted enhancer information; and a transmitter for transmitting the enhancer control signal to another connected signal processing device.

To achieve a second object, there is provided an apparatus for processing a signal received from a signal processing device which transmits an enhancer control signal, the control device for preventing the repeated signal processing in the signal processing system: a receiver for receiving the enhancer control signal; a controller for receiving the enhancer control signal from the receiver, analyzing enhancer information included in the enhancer control signal and generating enhancer control data to prevent the enhancer means from being processed repeatedly; and an enhancer means for executing a signal process to improve a video signal and an audio signal in accordance with the enhancer data.

To achieve a third object, there is provided a signal processing system, the multiple signal processing system comprising: a signal providing device for executing a predetermined enhancer signal processing in order to improve the video signal and the audio signal, and generating and transmitting an enhancer control signal corresponding to the enhancer; and a signal receiving device for inputting the signal processed by the signal providing device and the enhancer control signal, analyzing the enhancer control signal, preventing the enhancer means from being processed repeatedly in accordance with the analyzed result, and performing the signal processing of the built-in enhancer signal processing block in accordance with the information on the enhancer signal processing performed by the signal providing device.

To achieve a fourth object, there is provided a method of processing a signal in multiple signal processing devices, the control method of preventing a repeated signal processing in the signal processing system comprising: (a) generating an enhancer control signal including information related to an enhancer signal processing process to improve the signal in the signal processing device which provides the signal; (b) transmitting the enhancer control signal to a signal receiving device; and (c) performing the signal processing of the enhancer block in accordance with the enhancer control signal transmitted in step (b) in the signal receiving device.

BRIEF DESCRIPTION OF THE DRAWINGS

The above object and advantages of the present invention will become more apparent by describing in detail preferred embodiments thereof with reference to the attached drawings in which:

FIG. 4 is a detailed block diagram of a video signal processor shown in FIG. 3;

FIG. 5 is a detailed block diagram of a video enhancer block shown in FIG. 4.

DETAILED DESCRIPTION OF THE INVENTION

Figure 1:
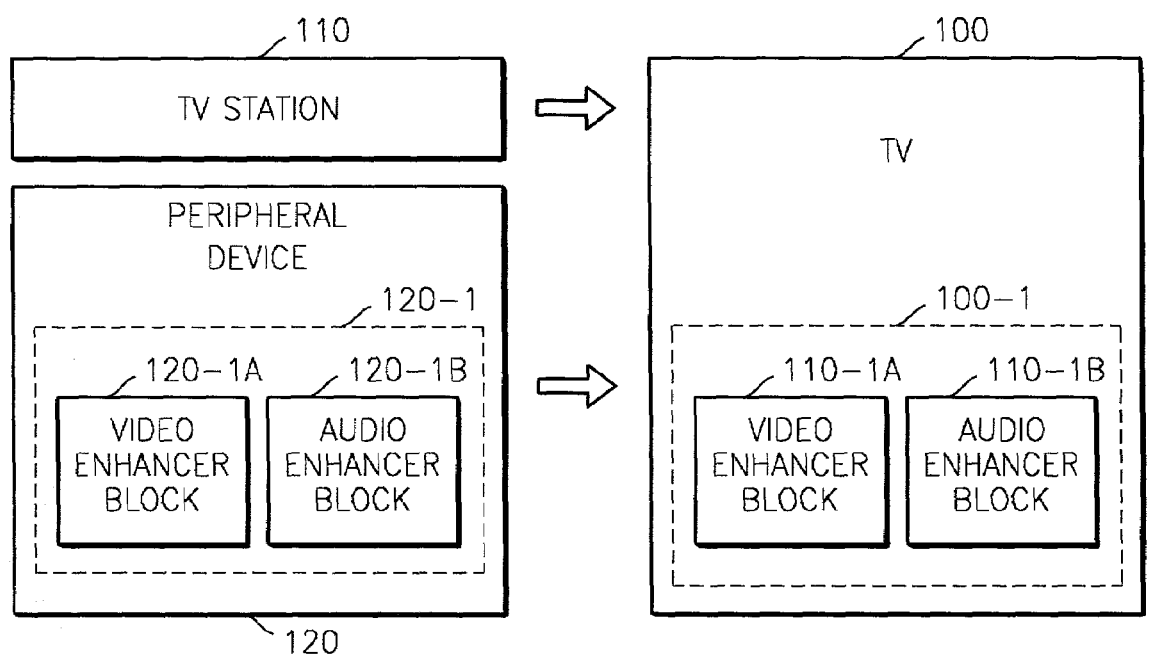
FIG. 1 is a block diagram of a multiple signal processing system that contains a television receiver and a peripheral device.
Figure 2:
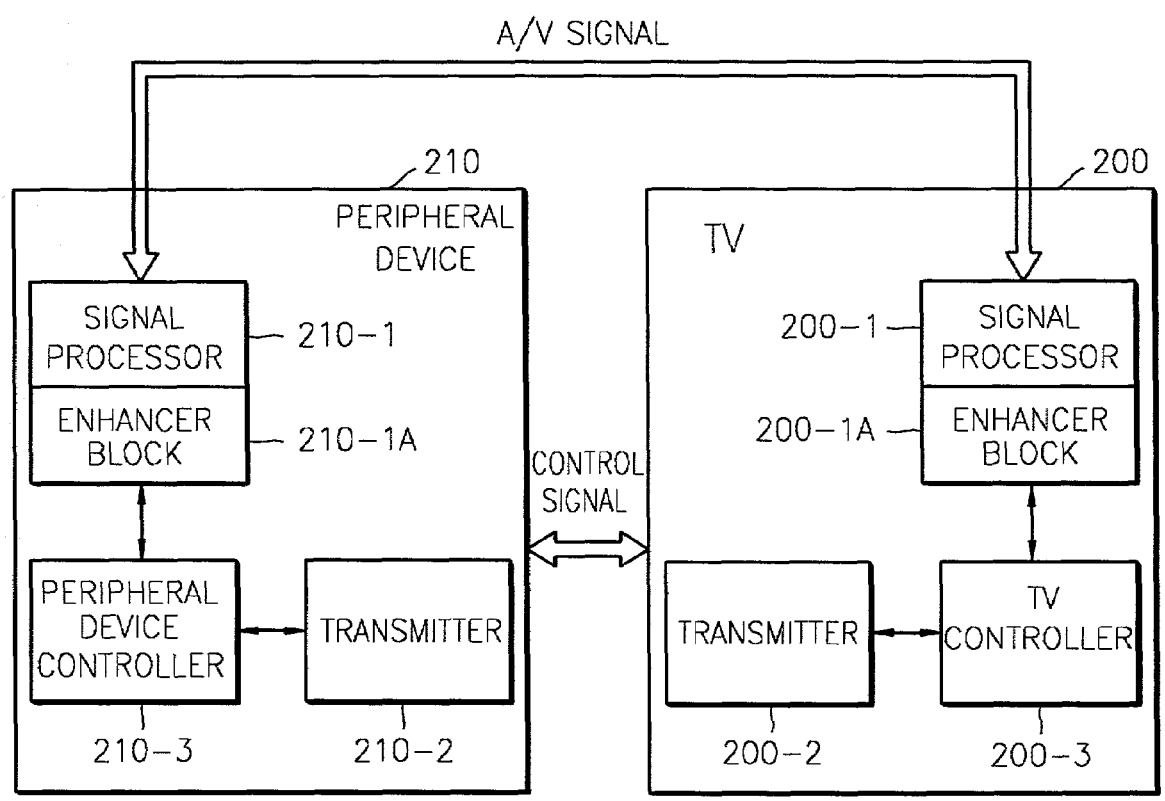
FIG. 2 is a block diagram of a control device that prevents a repeated signal processing in a signal processing system according to the present invention.

As shown in FIG. 2, a multiple signal processing system containing a control apparatus for preventing repeated signal processing according to the present invention includes a television receiver 200 and a peripheral device 210. To be more specific, the television receiver 200 includes a signal processor 200-1 which has a built-in enhancer block 200-1a, a transmitter 200-2 and a TV controller 200-3. The peripheral device 210 includes a signal processor 210-1 that has a built-in enhancer block 210-1a, a transmitter 210-2 and a peripheral device controller 210-3.

As a signal processing device, the peripheral device 210 may be, for example, a VCR, a DVD player, a set-top box or an audio player which provides the signal to the television receiver 200.

The enhancer block 210-1a built into the peripheral device 210 is designed to improve the quality of a video signal and an audio signal. Video signal enhancer blocks include, for example, an Interlace to Progressive Conversion (IPC) block, a frame rate conversion block, a detail enhancer block, a contrast enhancer block, a color enhancer block, a noise reduction block and a histogram equalization block. Audio signal enhancer blocks include, for example, a Dolby enhancer block and a high-fidelity signal processing block.

The peripheral device controller 210-3 generates an enhancer control signal including information on types and weighted values of enhancer processing means applied to the enhancer block 210-1a, and outputs it to the transmitter 210-2.

Then, the transmitter 210-2 transmits the enhancer control signal to the television receiver 200 which receives a signal from the peripheral device 210 by means of a wired or wireless communication.

The television receiver 200 according to the present invention prevents the enhancer signal from being processed repeatedly, using the enhancer control signal transmitted by the peripheral device 210. For detailed explanation, the block diagram of FIG. 3 will be referred to.

Figure 3:
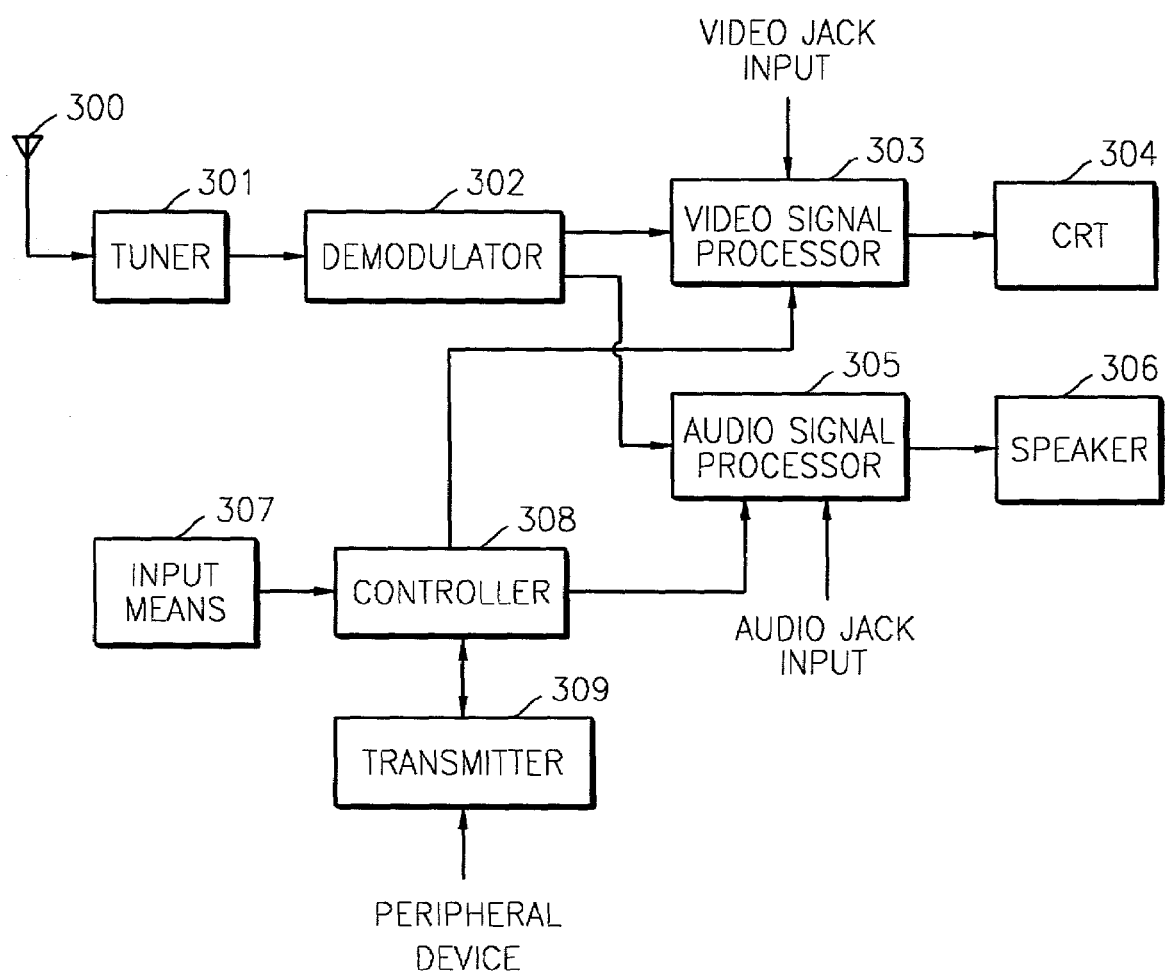
FIG. 3 is a detailed block diagram of the television receiver shown in FIG. 2.

As shown in FIG. 3, the television receiver 200 includes an antenna 300, a tuner 301, a demodulator 302, a video signal processor 303, a Cathode Ray Tube (CRT) 304, an audio signal processor 305, a speaker 306, an input means 307, a controller 308 and a transmitter 309.

The basic operation of the TV will be described below.

If a user turns on the TV by pressing a key button of the input means 307 such as a remote controller and selects a channel he wants to view, the tuner 301 selects and outputs the broadcasting signal of only the channel, which is selected by the user, of broadcasting signals received through the antenna 300. The demodulator 302 detects a video signal and an audio signal from the broadcasting signal of the selected channel, and outputs them to the video signal processor 303 and the audio signal processor 305 respectively.

The video signal processor 303 and the audio signal processor 305 process the signals respectively and output them to the CRT 304 and the speaker 306 respectively.

The present invention performs the signal processing in the following way, using the enhancer control signal transmitted in a wired or wireless communication manner together with the signal inputted through a video/audio jack input terminal from the peripheral device.

The transmitter 309 receives the enhancer control signal transmitted by the peripheral device 210, which is connected to the television receiver 200 and provides the video/audio signal, and then outputs the enhancer control signal to the controller 308. The enhancer control signal includes information on types and weighted values of enhancer processing means applied to the enhancer block 210-1a of the peripheral device 210.

The controller 308 analyses the enhancer control signal input from the connected peripheral device 210, and generates enhancer control data that controls the enhancer block built in the television receiver in order to prevent the video/audio enhancer signal from being processed repeatedly.

Each of the video signal processor 303 and the audio signal processor 305 controls a respective built-in enhancer block, using the enhancer control data generated by the controller 308, and prevents the enhancer signal from being processed repeatedly.

As shown in FIG. 4, the video signal processor 303 includes a decoder 401, a video enhancer block 402 and an encoder 403.

The decoder 401 converts an input composite video signal into a Y/U/V signal, and outputs the signal to the video enhancer block 402.

As shown in FIG. 5, the video enhancer block 402 includes a noise reduction block 402-1, an Interlace to Progressive Conversion (IPC) block 402-2, a histogram equalization block 402-3, a contrast enhancer 402-4 and a color enhancer 402-5.

The noise reduction block 402-1 is an enhancer designed to eliminate noise, using various digital filters. The IPC block 402-2 converts an interlaced scanning signal into a sequential scanning signal, using an interpolation algorithm, in order to improve resolution. The histogram equalization block 402-3 analyzes consistency between pixel positions by using a gray-level transformation function in order to improve visibility. The contrast enhancer 402-4 varies the luminance range of bright parts and dark parts of a video in order to improve visibility. The color enhancer 402-5 varies the balance of R/G/B gain values in order to improve the visibility of the colors. The enhancer means are controlled by the enhancer control data generated by the controller 308.

In case the enhancer control signal, which includes the enhancer information that the peripheral device converts the video signal into a progressive scanning signal and sends the signal to the television receiver, is transmitted to the transmitter 309, the controller 308 generates the control data in order to bypass the IPC block 402-2 and controls the IPC block 402-2.

In case the peripheral device executes the contrast enhancer signal processing, the controller analyzes the applied weight from the transmitted enhancer control signal, and controls the contrast enhancer 402-4 by using the enhancer control data corresponding to the applied contrast enhancer weight for processing the optimum contrast enhancer signal.

Similarly, the enhancer information processed by the peripheral device is reflected to control the audio enhancer means built into the audio signal processor 305.

Figure 6:
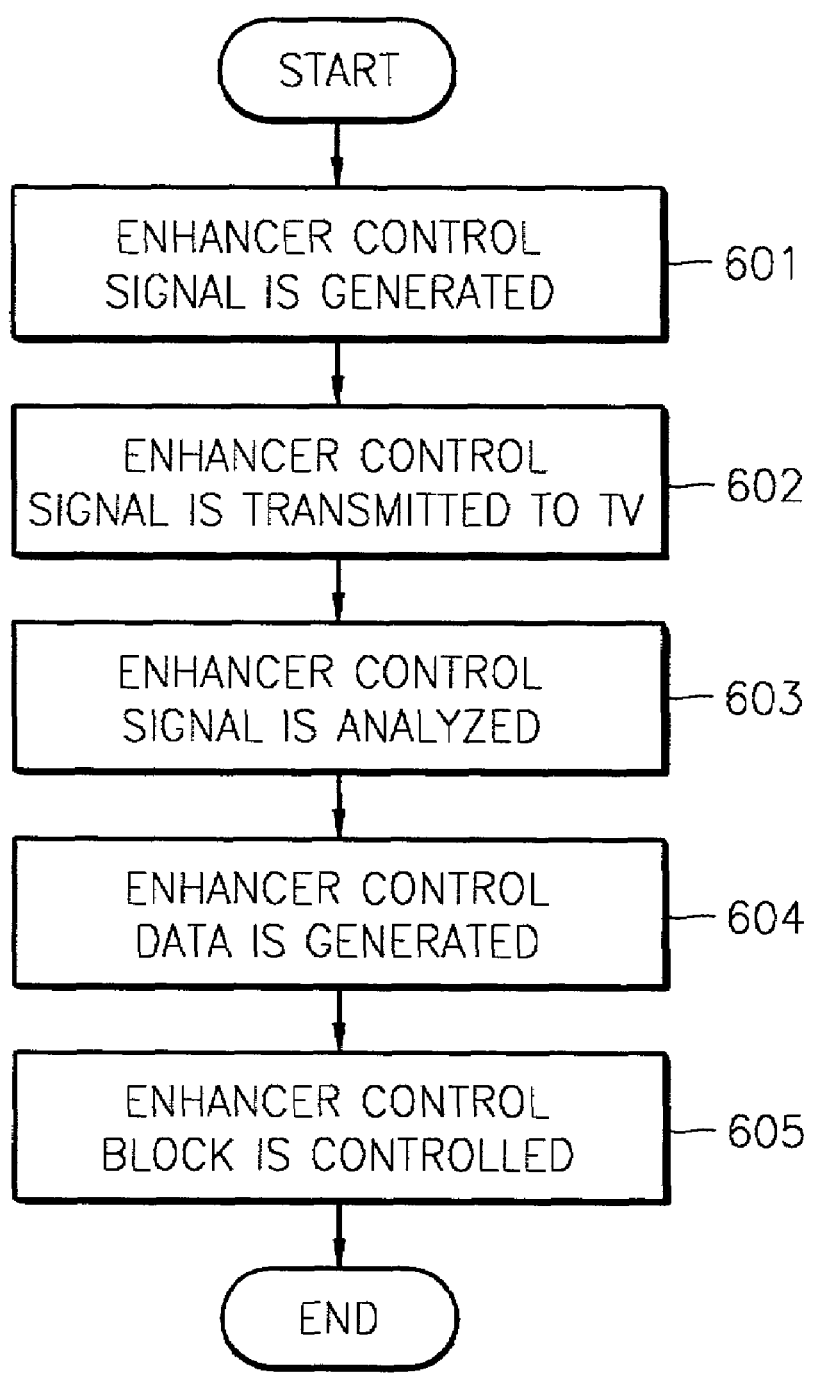
FIG. 6 is a flowchart showing a control method of preventing the repeated signal processing in the signal processing system according to the present invention.

With reference to the flowchart shown in FIG. 6, a method of controlling the enhancer signal processing block in the multiple signal processing system according to the present invention will be described.

In case the multiple signal processing system contains a peripheral device that provides a signal, and a television receiver which receives the signal, the peripheral device controller generates the enhancer control signal including information on types and weighted values of the enhancer processing means applied to the signal processing device which provides the signal in step 601. In step 602, the peripheral device controller sends the enhancer control signal to the television receiver, which receives the signal by means of a wired or wireless communication.

Upon receipt of the signal, the television receiver analyzes the enhancer control signal transmitted by the peripheral device in step 603. In step 604, the television receiver prevents the enhancer signal from being processed repeatedly by processing only the enhancer signal not processed by the peripheral device, and generates the enhancer control data to control the enhancer block by reflecting the weight applied to the peripheral device enhancer signal processing.

In step 605, the television receiver executes the signal processing of the enhancer block under the control of the enhancer control data in order to prevent the signal from being processed repeatedly.

As described above, the television does not repeatedly process the enhancer signal executed by the peripheral device.

The present invention can be implemented as a method, an apparatus and a system. When executed as software, the components of the present invention are code segments that execute the necessary tasks. Programs or code segments can be stored in processor-readable media, or transmitted by a computer data signal combined with a carrier in a transmission medium or a communication network. The processor-readable media include all types of media that can save or transmit information, such as an electronic circuit, a semiconductor memory element, a Read Only Memory (ROM), a flash memory, an E2PROM, a floppy disc, an optical disc, a hard disc, an optical fibre medium and a Radio Frequency (RF) network. The computer data signal includes any signal that can be propagated over transmission media such as an electronic network channel, an optical fibre, air, an electromagnetic field and an RF network.

While this invention has been particularly shown and described with reference to preferred embodiments thereof, it will be understood by those skilled in the art that various changes in form and details may be made therein without departing from the spirit and scope of the invention as defined by the appended claims.

As described above, the signal providing device according to the present invention transmits the enhancer information related to the signal processing by means of a wired or wireless communication. The signal receiving device uses the enhancer information and controls the signal processing block. Therefore, since the signal receiving device prevents the enhancer signal from being processed repeatedly, distortion of the signal can be avoided and an optimum signal can be output.

What is claimed is:

1. A signal processing device for transmitting enhancer information, the signal processing device comprising:
   an enhancer unit for improving at least one of a video signal and an audio signal using a predetermined signal processing process;
   a controller for extracting enhancer information executed by the enhancer unit and generating an enhancer control signal corresponding to the extracted enhancer information; and
   a transmitter for transmitting the enhancer control signal to another connected signal processing device.

2. The device of claim 1, wherein the enhancer control signal includes information on types of signal enhancement performed by the enhancer unit and weight of enhancement applied by the enhancer unit.

3. The device of claim 1, wherein the transmitter transmits the enhancer control signal via wired or wireless communication.

4. An apparatus for processing at least one of a video signal and an audio signal received from a signal processing device which transmits an enhancer control signal, comprising:
   a receiver for receiving the enhancer control signal which includes enhancer information regarding signal processing applied to the at least one of the video signal and the audio signal by the signal processing device;
   a controller for receiving the enhancer control signal from the receiver, analyzing the enhancer information included in the enhancer control signal and generating enhancer control data; and
   an enhancer unit for executing a signal process to improve the at least one of the video signal and the audio signal in accordance with the enhancer data to prevent the at least one of the video signal and the audio signal from being repeatedly subjected to the signal processing applied by the signal processing device.

5. The apparatus of claim 4, wherein the enhancer unit is either bypassed in accordance with the enhancer control data or caused to process the signal depending on a variable weight included in the enhancer control data.

6. A signal processing system, the system comprising:
   a signal providing device for executing a predetermined enhancer signal processing in order to improve at least one of a video signal and an audio signal, and generating and transmitting an enhancer control signal corresponding to the predetermined enhancer signal processing; and
   a signal receiving device for inputting the at least one of the video signal and the audio signal processed by the signal providing device and the enhancer control signal, analyzing the enhancer control signal to extract information on the predetermined enhancer signal processing, using the analyzed result to prevent the at least one of the video signal and the audio signal processed by the signal providing device from being repeatedly subjected to the predetermined enhancer processing, and performing signal processing on the at least one of the video signal and the audio signal in accordance with the information on the enhancer signal processing performed by the signal providing device.

7. The system of claim 6, wherein the enhancer control signal includes information on types and applied weight of the predetermined enhancer signal processing.

8. The system of claim 6, wherein the enhancer control signal is transmitted by means of a wired or wireless communication.

9. A method of processing a signal in multiple signal processing devices, the method comprising:
   (a) generating an enhancer control signal including information related to an enhancer signal processing process to improve the signal in a signal processing device, wherein the enhancer control signal includes enhancer information indicating a type of signal processing applied to the signal by the signal processing device;
   (b) transmitting the enhancer control signal to a signal receiving device; and
   (c) performing, in the signal receiver device, signal processing in accordance with the enhancer control signal transmitted in step (b).

10. The method of claim 9, wherein the enhancer control signal includes information on weight of enhancement applied by the enhancer signal processing process.

11. The method of claim 9, wherein the enhancer control signal is transmitted by means of a wired or wireless communication.

* * * * *